Nov. 29, 1960 J. W. HALINA 2,962,553
CODING AND DECODING SYSTEM
Filed Nov. 23, 1954 2 Sheets-Sheet 1

INVENTOR.
JOSEPH W. HALINA
ECKHOFF & SLICK
ATTORNEYS
BY [signature]
A MEMBER OF THE FIRM

CODING AND DECODING SYSTEM

Filed Nov. 23, 1954 2 Sheets-Sheet 2

INVENTOR.
JOSEPH W. HALINA
ECKHOFF & SLICK
ATTORNEYS
BY [signature]
A MEMBER OF THE FIRM United States Patent Office 2,962,553
Patented Nov. 29, 1960

2,962,553

CODING AND DECODING SYSTEM

Joseph W. Halina, Belmont, Calif., assignor to Donald E. Campbell

Filed Nov. 23, 1954, Ser. No. 470,707
11 Claims. (Cl. 179—15.6)

In many systems of communication, information is transmitted by the process of modulating a carrier. The carrier comprises electromagnetic waves of one or more frequencies and the modulation is the operation of varying the amplitude and/or frequencies or phase of the carrier. In general the carrier is modulated at frequencies which are much lower than the frequency or frequencies of the carrier. An example of such a transmission system is the "flicker lamp" in which the extremely high electromagnetic frequencies of light are modulated or keyed on and off at the relatively low rate of opening and closing a shutter. Another example is that of speech in which carrier frequencies in the range of approximately 200 to 4,000 cycles per second are modulated at the relatively low syllabic rate of word formation. Still another example is piano music in which carrier frequencies in the approximate range of 50 to 10,000 cycles per second are modulated at the relatively slow rate of manual keying.

In general, the carriers in these transmission systems are modulated at a rate so low in relation to the frequency or frequencies of the carrier that the carrier is sustained without substantial change in amplitude or frequency for a large number of cycles even at the lowest of the carrier frequencies.

Since the lowest carrier frequency need only be several times greater than the highest modulating frequency for transmission without substantial loss of fidelity with regard to the modulating frequencies, it follows that the information carried by a system utilizing a relatively high carrier to modulation frequency ratio can be substantially as well transmitted by another system utilizing a lower carrier to modulation ratio, provided that there is interposed between the transmitting and receiving ends some coding system which is capable of carrying out a transformation from one modulating system to the other at the transmitting end and carrying out the reverse transformation at the receiving end.

This invention relates to a frequency transformation system which is capable of accepting at its input a signal characterized by high carrier to modulating frequency ratios and transforming this signal to one bearing a lower carrier to modulating frequency ratio. This first operation is called the "direct transformation." The invention further relates to a frequency transformation system which is capable of accepting at its input a signal characterized by relatively low carrier to modulating frequency ratios and transforming this signal to one bearing a higher carrier to modulating frequency ratio. This second operation is called the "inverse transformation." In the information theory sense, the system may be termed a system of efficient coding and decoding.

Several advantages accrue from such a frequency transformation system from the point of view of transmission media and their optimum utilization. Although the system is applicable to frequency transformation of any signal bearing high carrier to modulating frequency ratios, the advantages will be described in relation to the transmission of speech. However, it should be understood that the invention is not limited to speech applications, but is an invention of general application.

The carrier frequencies of speech lie in the approximate range of 200 to 4,000 cycles per second. The rate of modulation is that of syllabic formation and is, perhaps, not greater than the equivalent of 20 to 30 cycles per second. Although the modulation rate is relatively low, the wide range of carrier frequencies produced by the vocal mechanism makes it necessary to use communication channels of approximately 4,000 cycles in bandwidth. The necessary bandwidth is not greater than several times the modulation rate.

In commercial telephony, a multiplicity of conversations can be transmitted over a single transmission medium by the well-known process of "stacking" the individual conversations at intervals of the order of 4,000 cycles or greater by the methods of modulation such as single sideband suppressed carrier modulation. However, there are definite limits to the number of voice channels which can be accommodated on a single transmission medium when this system is used. These limitations are due to the high frequency response of transmission lines, legal restrictions on the bandwidth of radio transmissions, the pass bands of practical amplifiers and the like. The present invention is intended to permit the accommodation of many more voice channels than before, over the single transmission medium.

According to the present invention, a carrier frequency $f$ is converted into a carrier of frequency $Af$ wherein A is a fraction of 1 and wherein both the numerator and denominator are small whole numbers; thus, A can be a fraction such as 1/1, 1/2, 1/3, 2/3, 1/4, 3/4 and the like. The modulation, at frequency $f_m$ is, however, unaffected in amplitude except for a constant of transmission. This division of the carrier frequency is called the direct transformation.

If, to three voice channels each of 4 kc. width—which were previously modulated into the range of 12 to 24 kilocycles by means of single sideband suppressed carrier modulation—the direct transformation were applied, the resulting effect would be that of multiplying all frequencies by A. If A were 1/3, for example, then the three channels would be transformed to the range or band from 4 to 8 kilocycles. The multiplication by 1/3 is the same as division by 3 and the first or direct transformation is sometimes referred to as frequency division and the mechanism for doing it as a frequency divider.

The two principal advantages resulting from this direct transformation are that the highest frequency has been reduced by the factor A firstly, and that the bandwidth has been reduced by the factor A secondly. The same medium can thus handle 1/A or, in the case of the present numerical example, 3 times the number of channels of the same reduced band width without exceeding the top frequency of the original 12 to 24 kilocycle range. A still further advantage results from the phenomenon that noise in a transmission system is directly proportional to its bandwidth and any reduction in bandwidth produces a proportional improvement in signal to noise ratios.

The invention also relates to the inverse transformation in which a carrier of frequency F is converted into a carrier of frequency BF, where B is any fraction of a value to or greater than 1, the numerator and denominator of which are integral numbers, e.g., 1, 2, 3/2, 3, 4/3, 4, etc. Thus, if in connection with the preceding example B is made equal to 1/A or 3, the application of the inverse transformation to the result of the direct transformation yields a reproduction or reconstitution of the original signal with substantially no loss of fidelity.

In the drawings forming a part of this application:

Figure 3:
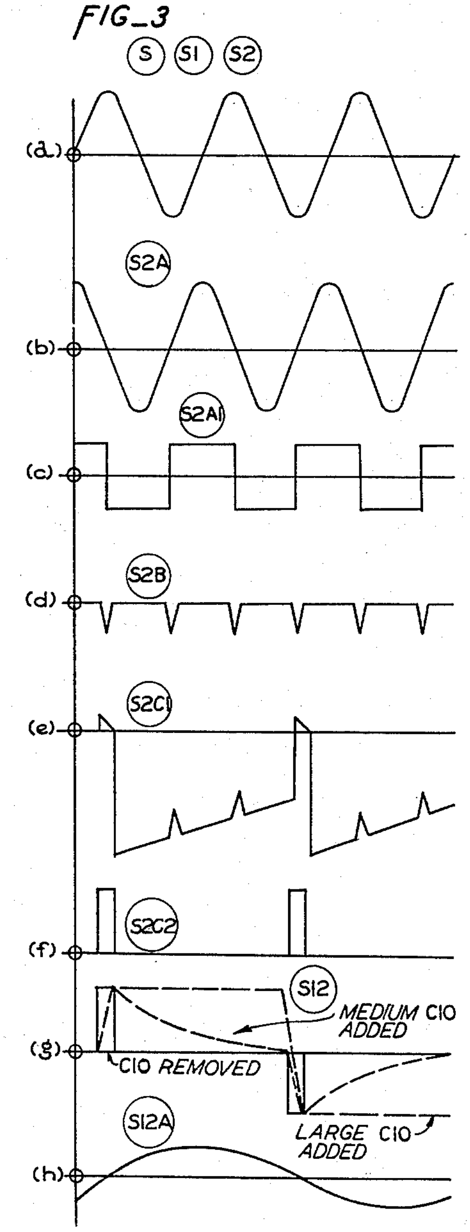
Figure 4:
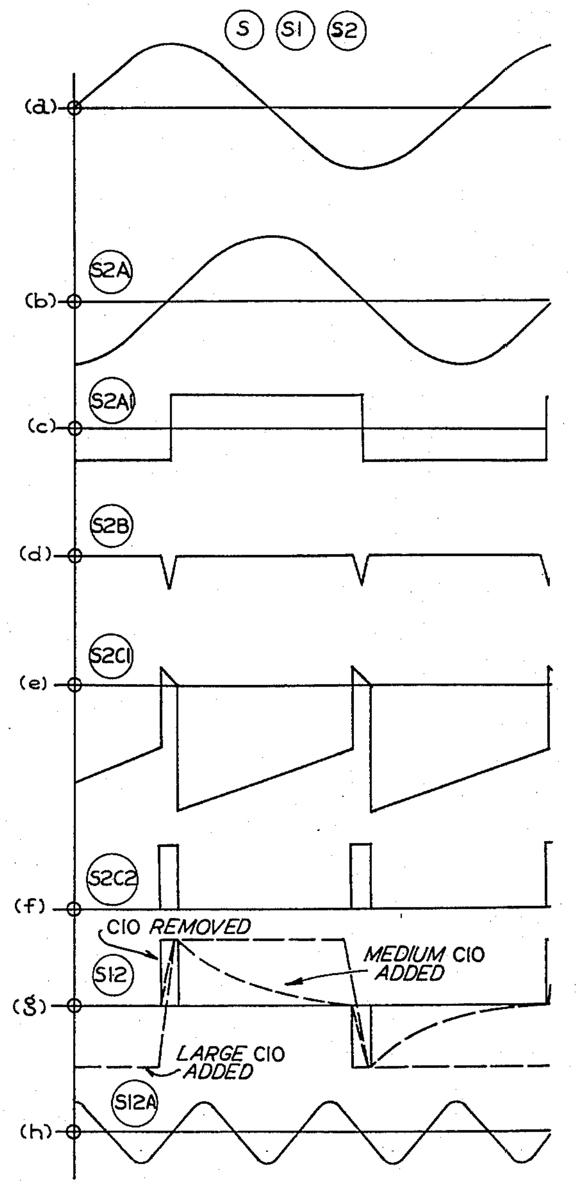

Figures 3 and 4 are rectangular coordinate representations of typical wave forms encountered at various stages of the transformation of the present invention; Figure 3 illustrates direct transformation, while Figure 4 represents inverse transformation; the vertical scale of Figures 3(*h*) and 4(*h*) being half the vertical scale of the remaining portions of Figures 3 and 4 and the wave forms of Figures 3(*a*) and (*b*), Figure 4(*a*) and (*b*) illustrating alternating waves of cyclic form having zero crossings at their intersections with the horizontal, zero ordinate.

Figure 1:
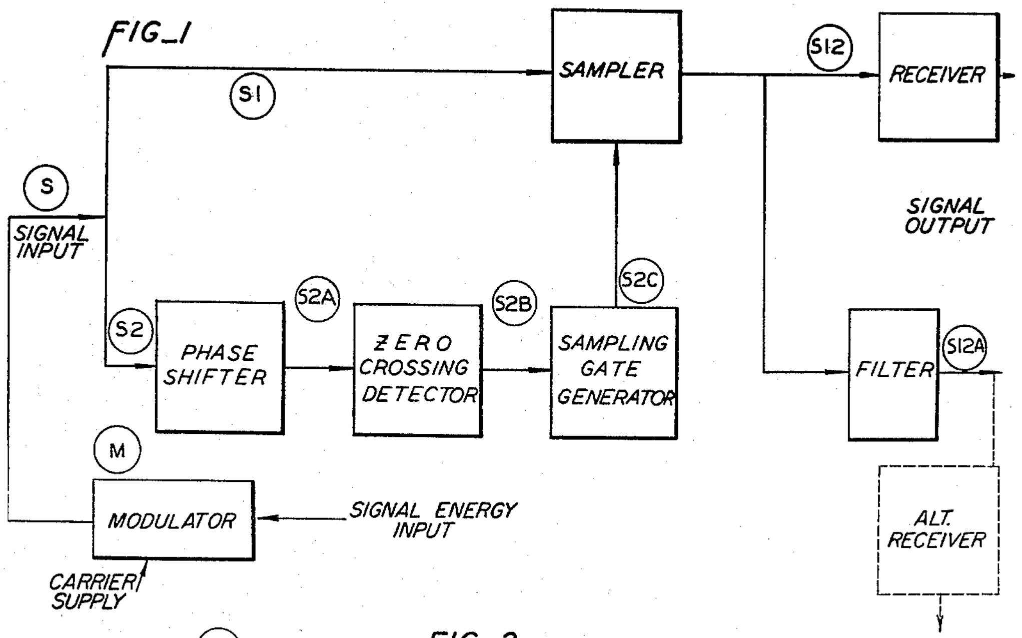
Figure 1 is a block diagram of one embodiment of the present invention.

Reference will now be made to the block diagram of the system as shown in Figure 1. In the system employed in this invention, the modulated carrier, which we shall call the signal and which is denoted as S in the block diagram, is derived from a modulator M receiving the input signal energy and the carrier current from a suitable supply and is divided into two parts or sub-signals denoted sub-signal S1 and sub-signal S2. Sub-signal S1 is transmitted directly to a device called the Sampler, which is to be described in greater detail below. Sub-signal S2 is transmitted to a device called the Phase Shifter, the function of which is to advance or delay all the carrier frequencies in the partial or sub-signal by a predetermined amount which can be expressed as a selected or fixed angle. Although a suitable phase shift is 90°, a lesser or greater phase shift is possible.

The output of the phase shifter, denoted as signal S2A in Figure 1, is then transmitted to the Zero Crossing Detector. A "zero crossing" is defined as follows: An alternating current signal varies in amplitude above or on the positive of and below or on the negative side of a zero level. The number of oscillations about the zero level per unit time is the frequency. The event of the signal amplitude value changing from one side of the zero level to the other is called a "zero crossing." In general, there are two zero crossings per cycle.

The output of the Zero Crossing Detector denoted as signal S2B in Figure 1 is a series of pulses which occur at times which correspond to the zero crossings of signal S2A. These pulses also bear a phase relationship to signal S1 which was predetermined in the adjustment of the Phase Shifter. If, for example, the phase shift in the transmission of signal S2 through the Phase Shifter were 90°, the pulses at the output of the Zero Crossing Detector would correspond in time to the crests and troughs of signal S1.

The output of the Zero Crossing Detector is transmitted to a Sampling Gate Generator. The latter produces a pulse called a "sampling gate" for every zero crossing pulse at its input or on a predetermined count of zero crossings. The choice of count in the Sampling Gate Generator is based on considerations to be explained below. The sampling gate so generated and denoted as signal S2C in Figure 1 is applied to the Sampler.

There is now present, at one input to the Sampler, the partial or sub-signal S1 and, at the other input, the sampling gate signal S2C. The function of the Sampler is to permit the transmission of that part of sub-signal S1 which can pass through it during the period of the sampling gate. Since the sampling gate is short in relation to the period of one cycle of sub-signal S1, the output of the Sampler consists of a series of pulses, the amplitude and sense of which are functions of the amplitude and sense of sub-signal S1 and the time of occurrence of which is a function of the zero crossings of the phase shifted sub-signal S2 and the count in the Sampling Gate Generator.

Thus the direct transformation process is one of coherent sampling. It is coherent in that the sampling rate is a function of the signal itself and is correlated to it by two predetermined factors, namely, a phase shift and a count of zero crossings.

It is noted at this point that the process of sampling as herebefore described is but a special form of modulation in general. Hence, for a specific output frequency or range of frequencies, a process directly equivalent to "coherent sampling" would be the following one of "coherent heterodyning." The output of the Sampling Gate Generator would be filtered to obtain the desired band of harmonics of the sampling gate pulse train. The resulting filtered output would be transmitted to the Sampler, which could then be simply called a modulator, and heterodyned with sub-signal S1. Such a procedure would be an alternate method and an equivalent of the sampling procedure. This equivalent will be described in greater detail below.

It is known that to reproduce a signal of a known shape or mathematical curvature it is necessary to provide a minimum of two "pieces" or "bits" of information per cycle of the highest frequency present in the signal. Thus one may provide a specification of an amplitude and the phase at which the specified amplitude occurred in the cycle. Or, one may provide two samples of amplitude per cycle of the highest frequency present in the signal separated by a fixed phase. The manner on which these considerations apply in the frequency transformations carried out in the system of this invention can be illustrated by considering three successive cases.

*Case 1.*—If the Sampling Gate Generator produces a sampling gate on every zero crossing, the output wave train signal S12 would provide two specifications of amplitude and two specifications of phase per cycle of the input sub-signal S1. This is a total of four pieces of information per cycle and therefore an excess of two over the minimum required. If this series of samples were passed through a filter tuned to the frequency of S1, then the original signal, modified by a constant of transmission, would be recovered. Moreover, if components of a frequency up to two times the frequency of S1 were present, they would also be recovered by suitably tuning the filter.

*Case 2.*—If the Sampling Gate Generator produced a sampling gate at every second zero crossing, the output of the Sampler would contain one specification of amplitude and one specification of phase per cycle of the frequency of sub-signal S1. This is a total of two pieces of information per cycle and is the minimum necessary in order to recover the signal. That is, the original signal can be recovered if the train of samples are passed through a filter tuned to the required signal. In contrast to Case 1, if sub-signal S1 contained components of a higher frequency than the predominant frequency of S1, these components could not be recovered.

*Case 3.*—If, now, the Sampling Gate Generator produced a sampling gate on every third count of zero crossings at its input, it is apparent that, of two successive samples in the pulse train, the first would be a sample of the positive (or negative) excursion of one cycle of S1 in relation to the zero level and at a phase difference predetermined by the Phase Shifter and the second sample would be a sample of the negative (or positive) excursion of the following cycle of S1 at the phase difference predetermined by the Phase Shifter. If the carrier wave did not change substantially in frequency or amplitude over a period of three or more cycles—and it would not if the carrier to modulating frequency ratio is high—the pulse train out of the Sampler would have substantially the same relation to the amplitude and to ⅓ of the frequency of the signal carrier as the pulse train of Case 1 had to the signal carrier itself. If the pulse train of the present case is now transmitted to a filter tuned to ⅓ the carrier frequency of sub-signal S1, a signal of ⅓ the carrier frequency would be recovered at the output of the filter. Moreover, since the number of pieces of information is still four per cycle in relation to ⅓ the carrier frequency of the signal, if the signal S1 has carrier components of frequency up to two times the predominant frequency, those components would be recovered in the divided form by suitably adjusting the filter.

The process described to this point is that of the direct transformation in which carrier frequencies $f$ are transformed into pulse trains or, by filtering, into carrier frequencies A$f$ where A is given by the following relationships:

$A=1/n$ where $n$ is the sampling gate generator count and is an odd number such as 1, 3, 5, 7, etc.

$A=2/n$ where $n$ is the sampling gate generator count and is an even number such as 2, 4, 6, 8, etc.

Where A is 1, there is no over-all transformation or condensing but this is included as the limiting value.

Limitations on the possible choice of A and $n$ are considered later.

Returning now to the discussion under the various cases, it is noted that since the pulse train of the lower frequency or "divided" signal S12 contains harmonics of its own fundamental recurrence frequency, a filter tuned to 1/A or $n$ times the periodic recurrence frequency of the pulse train would recover the undivided carrier frequency or frequencies. These are modified with regard to amplitude only by a constant of transmission. By suitably adjusting the shapes of the pulses in the pulse train of signal S12, any harmonic of the divided frequency can be recovered by filtering.

Thus, if the directly transformed signal is transmitted in pulse form, the original signal can be substantially reconstituted by suitable filtering to pass the desired harmonic; that is the inverse transformation would consist of simply filtering and also amplifying to correct for the constant of transmission.

In many cases, conservation of the capacity of the transmission medium makes it desirable to transmit the directly transformed signal in filtered form and therefore containing only predominant frequencies of the carrier multiplied by the direct transformation factor A. At the receiving end, in these cases it is no longer possible to carry out the inverse transformation and to recover the original sub-signal S1 by simple filtering and amplification. In these cases the inverse transformation is carried out and the original signal is reconstituted by processing the received signal through a device called an Inverse Transformer which is identical in all respects to that described in connection with the direct transformation with the exception that the Sampling Gate Generator in the Inverse Transformer always produces a sampling gate at the occurrence of every zero crossing pulse at its input irrespective of the choice of transformation factor A at the transmitting end. The output of the (inverse) sampler is then the required pulse train from which the desired harmonic of the directly transformed signal can be extracted by filtering.

In both the direct and inverse transformation, the modulations of the carrier are preserved with regard to both frequency and amplitude except for a constant of transmission with regard to the latter.

Returning now to the equivalent modulation process discussed previously, reference will again be made to the example of Case 3 above to illustrate the equivalence. Since the count was 3 in this case and therefore odd, the periodic recurrence frequency of the Sampling Gate Generator output is ⅔ times the sub-signal frequency. If this pulse train is filtered to select the fundamental and the resulting output transmitted to the Sampler or modulator, a heterodyning action would take place in the modulator and the output would contain the frequency $f$ of the sub-signal S1, the frequency ⅔$f$ of the signal S2C as well as the sum and difference of these two frequencies, namely, ⅚$f$ and ⅓$f$. This output signal S12 could again be passed through a filter tuned to the desired band. By suitable filtering of both signals S2C and S12, a transformed signal can be obtained in which the transformation factor A is a fraction with any number in the numerator and any other number in the denominator. An inverse transformation could then be applied to obtain the original signal or some other transformation of it.

Much of the discussion to this point has been based on the choice of the factor A equal to ⅓. In practice, many other values may be selected. Since in practice and except in the most simple cases, the carrier frequencies of signal S will range between a lower frequency bound $f1$ and an upper frequency bound $f2$ and the modulation frequencies will range to some upper frequency bound $fm$, certain relationships may have to be preserved between the choice of transforming factor A and the three frequencies $f1$, $f2$, and $fm$ for the best recovery of the signal at the receiving end. From bandwidth considerations, A($f2-f1$) cannot be smaller than $fm$. From modulation considerations, A$f1$ cannot be be smaller than $fm$. In compressing a relatively high ratio band of, say, 250 to 4,000 cycles, it is desirable first to convert the band to a single octave or less to secure maximum advantage of the invention. The method of converting the band to a single octave or less is well-known to those skilled in the art and will not be discussed herein. Other limitations may arise due to considerations of technique.

For a better understanding of this invention, one embodiment of it will now be discussed with reference to the schematic diagram of Figure 2 and the waveform drawings of Figures 3 and 4. It is understood that many specific techniques can be used in the matter of phase shifting, zero crossing detection, counting, pulse generation, sampling, modulating, filtering, etc. The techniques illustrated in the schematic diagram of Figure 2 have been chosen from the point of view of ease and clarity of explanation of a specific embodiment without intent to imply confinement of the system to these techniques. The specific embodiment is also based on the sampling rather than the equivalent heterodyning technique discussed in the preceding pages.

Figure 2:
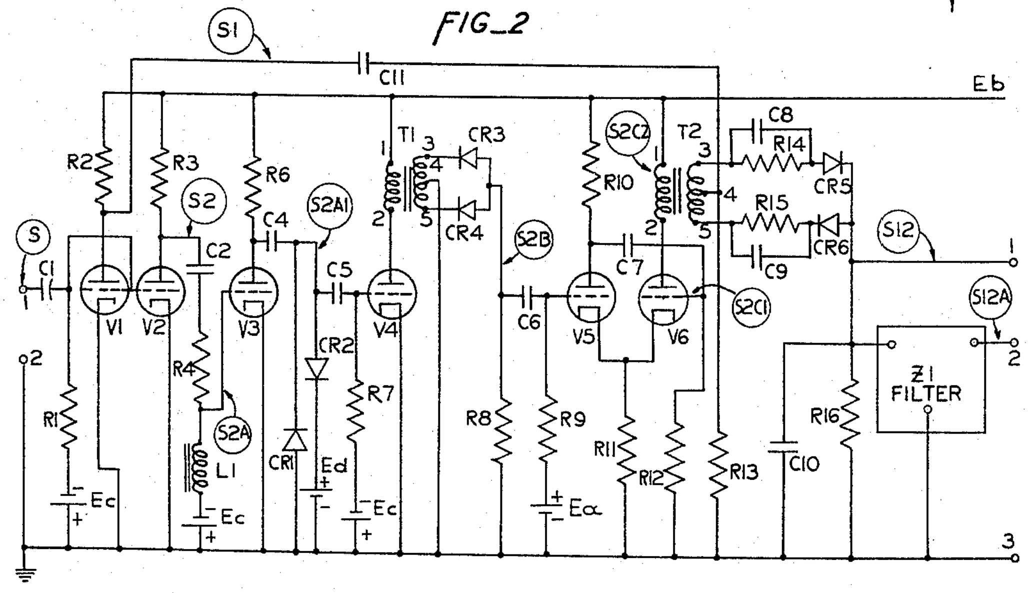
Figure 2 is a schematic diagram of one embodiment of the present invention; an alternate portion of the circuit is shown as Figure 2A.

Referring now to Figure 2, a signal S of amplitude A$m$ and frequency $f$, where A$m$ and $f$ may vary in accordance with the rate of modulation of the carrier as previously set forth, is coupled through the terminals 1 and 2 on the left-hand side of the figure to the direct frequency transformer through the network consisting of capacitor C1 and resistor R1. A representation of such a signal is given in Figure 3($a$) and denoted as S.

In the schematic diagram of Figure 2, E$b$ denotes the plate supply voltage for amplifiers V1 to V6, and E$c$ and E$a$ denote the control grid bias voltages for associated amplifiers.

The network consisting of capacitor C1 and resistor R1 serves to couple signal S to the two amplifiers V1 and V2. Signal S appears as sub-signal S1 across load resistor R2 of amplifier V1 and as sub-signal S2 across load resistor R3 of amplifier V2. Sub-signals S1 and S2 are identical to signal S except for a factor of amplification due to transmission through amplifiers V1 and V2.

Figure 2A:
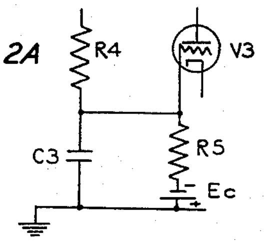

Sub-signal S2 is coupled to the control grid of amplifier V3 through the network consisting of capacitor C2, resistor R4 and inductor L1. The elements R4 and L1 are so chosen that the impedance of L1 at the frequency $f$ is small in relation to that due to resistor R4. As a consequence, the current through the series connection of R4 and L1 is in phase with the voltage of sub-signal S2. The signal voltage developed across L1 will then be nearly 90° in advance of the current and therefore in advance of the voltage of S2. A similar phase shift but in the reverse direction can be accomplished by substituting L1 with the network shown in Figure 2A and composed of resistor R4 and capacitor C3, if the value of C3 is chosen such that its impedance at the frequency $f$ is small in relation to that of R4. Resistor R5 in this alternate network is large and serves as a grid leak path for the control grid of amplifier V3.

Sub-signal S2A, advanced or delayed in relation to sub-signal S1 depending on the choice of L1 or C3 for the phase shift element, is represented by the waveform of Figure 3($b$). Signal S2A is amplified by amplifier V3 and appears across load resistor R6. It is then coupled by means of capacitor C4 to a shunt type limiting network consisting of unidirectional conducting devices CR1 and CR2 and biasing voltage E$d$. Amplitude levels of the signal which exceed the voltage E$d$ are clipped or limited. The amplification factor of V3 is such that the smallest signal amplitude likely to be encountered is amplified to a voltage well above the operating level of the limiter so that the resulting signal S2A1 is then essentially a square wave of the frequency of the sub-signal S2 but of a constant amplitude. This signal is represented by the waveform of Figure 3($c$).

Signal S2A1 is coupled to the control electrode of amplifier V4 through the network consisting of capacitor C5 and resistor R7. Transformer T1 in the output circuit of amplifier V4 is of a type known to the art as a pulse transformer. Such a transformer is capable of passing only relatively high frequencies such as those which make up short pulse waveforms. As a result of this characteristic, when a signal of the square wave form of S2A1 is applied to terminals 1 and 2 of transformer T1, the output across transformer terminals 3 and 4 and transformer terminals 4 and 5 consists of sharp pulses which are negative going when the square wave voltage changes from a positive value to a negative value and similar sharp pulses which are positive going when the square wave voltage changes from a negative value to a positive value. The center tap 4 of the secondary winding of transformer T1 is grounded and transformer terminals 3 and 5 are coupled to resistor R8 by means of unidirectional conducting devices CR3 and CR4. The effect of this connection is to make a full wave rectifier. As a result, the signal across R8 consists of a sharp negative going pulse for each zero crossing or change of polarity of the signal S2A1 and a pulse train of the form shown in Figure 3$d$ is obtained. This pulse train, denoted as signal S2B, is coupled through the network consisting of capacitor C6 and resistor R9 to a multivibrator counter consisting of amplifiers V5 and V6 and associated circuit elements.

The multivibrator counter operates in the following manner. In the absence of any signal at the control grid of amplifier V5, the effect of the positive bias voltage E$a$ on its control grid is to cause this amplifier to conduct heavily. Upon the arrival of the first sharp negative spike from the preceding zero crossing detector, conduction of current through V5 is reduced and the potential at the plate rises in the form of a step. Capacitor C7 begins to charge through the grid and cathode of amplifier V6 in series with resistor R11 and in parallel with resistor R12. The potential on the control grid of amplifier V6 becomes positive. Prior to this instant, conduction of current through amplifier V6 had been cut off due to the conduction of amplifier V5 and the high potential across R11. When the potential of the control grid of amplifier V6 becomes positive in relation to the potential across R11, V6 conducts and its conduction current through resistor R11 causes the potential of the plate of amplifier V5 to rise still further above the potential of its control grid.

V5 remains cut off and V6 continues conducting for a period of time during which capacitor C7 is charging. The length of this period is small and is determined by the time constant $C7R_{eq}$ in which $R_{eq}$ is the equivalent resistance of the series path through the grid and cathode of V6 and resistor R11 and the parallel path through resistor R12. Since resistance R12 is made much greater than the equivalent resistance of the path through the grid and cathode of V6 and resistor R11, the time constant is largely determined by the latter path of current conduction.

As soon as capacitor C7 stops charging, the positive potential of the grid of V6 in relation to the cathode drops and conduction through V6 is reduced. V5 starts to conduct, the potential at its plate falls and capacitor C7 begins to discharge. V6 then ceases to conduct altogether.

Since amplifier V6 does not offer a conduction path from cathode to grid, capacitor C7 must discharge through resistor R12. A large negative potential is developed across R12 and keeps V6 cut off. When the second negative spike arrives at the grid of V5 from the preceding zero crossing detector and is amplified into a positive going spike at the plate of V3, it is not of sufficient magnitude to over-ride the negative potential at the grid of V6 caused by the slowly discharging process of C7. By a suitable choice of values for capacitor C7 and resistor R12, V6 can be prevented from conducting or "firing" again until a desired predetermined count of zero crossing spikes have occurred at the grid of V5. This effect is shown in the waveform drawing of Figure 3($e$) which represents the waveform developed at the grid of V6 in the course of the process just described.

In the waveform representations of Figure 3, the multivibrator is shown adjusted to fire on every third zero crossing pulse. This count is, of course, arbitrarily chosen for purposes of illustration and is not intended to limit the count to that specific number.

It is seen from the preceding discussion that the operation of the multivibrator counter or Sampling Gate Generator is to produce a short gating pulse across terminals 1 and 2 of transformer T2 in the load circuit of amplifier V6. This gating pulse occurs on a predetermined count of zero crossing pulses at the input to the gate generator and in the case of the present example occurs on a count of 3. The gating waveform, denoted as signal S2C2, is shown in Figure 3($f$).

The effect of signal S2C2 at terminals 1 and 2 of transformer T2 is to open a path for sub-signal S1, which is connected to terminal 4 of the secondary of the transformer, through the network consisting of capacitors C8 and C9, resistors R14 and R15 and unidirectional conducting devices CR5 and CR6 to the shunt network composed of resistor R16 and capacitor C10. This is accomplished in the following way. The first sampling gate to appear across terminals 1 and 2 of transformer T2 causes a large surge of current in a clockwise direction through the circuit associated with the secondary of transformer T2. As a consequence, capacitors C8 and C9 charge rapidly through the low forward resistance of CR5 and CR6. During this period of conduction on the part of CR5 and CR6, sub-signal S1 which is present at center tap terminal 4 of T2 also sees a low resistance conduction path through the parallel combinations in the two arms of the secondary of the transformer, C8 and C9, and CR5 and CR6. At the end of the gate, capacitors C7 and C9 attempt to discharge in the reverse direction through the non-conducting direction of CR5 and CR6. As a result, a large reverse bias is placed on both CR5 and CR6 and any further conduction of sub-signal S1 is obstructed.

The waveform across R16 is therefore a series of samples whose acceptance rate is determined by the frequency of occurrence of the sampling gate and whose amplitude is the amplitude of sub-signal S1. The shunting effect of capacitor C10 is to modify the waveform across R16. This is shown in Figure 3($g$) in which the waveform of signal S12 is shown as the relative size of capacitor C10 is increased.

The output from the direct frequency transformer can be taken in the pulse form from output terminals 1 and 3 in which case it has the form of Figure 3($g$) or else it can be taken from output terminals 2 and 3 after passing through band pass filter Z1. Since filter Z1 is tuned to the band of frequencies between $Af1$ and $Af2$ where $f1$ and $f2$ are the lower and upper bounds respectively of the carrier frequency variation, the output signal will have the waveform of signal S12A shown in Figure 3(*h*) (in which the vertical scale is halved), that is, it will have the waveform of S1 directly transformed or divided by the factor A.

This description now turns to the process of inverse transformation of signal S12 or S12A after it has been received at the end of its transmission path.

If, as indicated in the earlier general discussion, the transformed signal is transmitted as S12, that is, in one of the pulse waveforms of Figure 3(*g*), the inverse transformation at the receiving end is executed by simply filtering out unwanted harmonic and passing only the harmonic of the incoming waveform which corresponds to the frequencies of sub-signal S1 and amplifying.

If the signal is transmitted in the form of signal S12A as represented in Figure 3(*h*), the inverse transformation becomes very similar to that of the direct transformation. In the inverse transformation, signal S12A of Figure 3(*h*) is considered as the incoming signal S of Figure 4(*a*). The inverse transformer is again represented by the schematic diagram of Figure 2, and the steps through which signal S is processed are identical to those in the direct transformation. The time constants in the multivibrator-counter V5—V6 remain unchanged but, since the zero crossing pulses now occur at A times the rate at which they occurred in the direct transformation, the Sampling Gate Generator produces a sampling gate for every zero crossing pulse at its input as shown in Figures 4(*d*), (*e*) and (*f*). The output of the Sampler, that is to say, the waveform across the resistor capacitor combination of R16 and C10 has the form of Figure 4(*f*) which is identical to that of Figure 3(*f*). Filter Z1 in the inverse transformer is tuned to pass harmonics corresponding to the frequency band $f1$ to $f2$.

One of the important characteristics of this transformation system is that a signal can be transmitted or received only when zero crossing spikes of sufficient amplitude are presented to the sampling gate generator to cause it to operate. Thus, by suitable adjustment of the amplification factor of the zero crossing detector, both direct and inverse transformers can be caused not to operate on noise levels which are lower than the lowest level of signal to be processed. The resulting effect is that of the suppression of noise during non-signal periods as is the case between words of speech.

I claim:

1. Apparatus for treating a cyclic signal having a variable frequency and varying in amplitude between positive and negative values comprising means for dividing said signal into a first cyclic sub-signal having a variable frequency and varying in amplitude between positive and negative values and a second cyclic sub-signal having a variable frequency and varying in amplitude between positive and negative values, means for shifting the phase of said second sub-signal with respect to said first sub-signal, means for taking amplitude samples of said first sub-signal, means responsive to the occurence of a selected portion of the cycle of said second sub-signal for transmitting selected portions only of cyclically spaced ones of said amplitude samples of said first sub-signal, and means for repeatedly reproducing each of said transmitted selected portions to approximate said cyclic signal.

2. An apparatus for using successive waves considered as arbitrary groups, each group having the same number of cycles of variable amplitude and variable frequency, comprising means responsive to and operating at the variable frequency of said cycles for determining the amplitude of a predetermined portion of only one selected wave in each of said groups, means for establishing a train of oscillations, each successive oscillation having an amplitude at the corresponding predetermined portion of said oscillation that is proportional to said amplitude of the corresponding one of said successive selected waves, and means for providing a signal substantially made up of a predetermined harmonic of each of said oscillations in said train.

3. An apparatus for using successive waves considered as arbitrary groups each group having a predetermined number of cycles of variable amplitude and variable frequency comprising means responsive to and operated at the variable frequency of said cycles for selecting only one wave in each of said groups, means for establishing a train of oscillations, each successive oscillation having an amplitude proportional to that of a corresponding part of said one of said successive selected waves, and means for providing a signal substantially made up of a predetermined number of repetitions of each of said oscillations in said train.

4. An apparatus for using successive waves considered as arbitrary groups, each group having the same number of cycles of variable amplitude and variable frequency comprising means responsive to and operated at the variable frequency of said cycles responsive to a selected portion of each of said waves in each of said groups for determining the maximum amplitude of only one selected wave in each of said groups, means for establishing a train of oscillations, each oscillation having a maximum amplitude proportional to that of each of said successive selected waves, and means for providing a signal substantially made up of a predetermined harmonic of each of said oscillations in said train.

5. An apparatus for using successive waves considered as arbitrary groups each group having a predetermined number of cycles of variable amplitude and variable frequency, comprising means controlled by a cyclic change of said waves between negative and positive values for determining the amplitude of said waves a quarter cycle later, means for establishing oscillations in a train, each oscillation having an amplitude comparable to the amplitude of a single wave in each one of said groups, and means for providing a signal having frequencies each of which is a predetermined multiple of the frequency of each of said oscillations in said train.

6. A coding and decoding system for use with an incoming signal of variable frequency and variable amplitude comprising means responsive to said variable frequency of said signal and effective to select from said incoming signal a predetermined frequency fraction of said signal having a corresponding original amplitude, means for transmitting said selected frequency fraction at substantially said original amplitude, and means for receiving and repeating said selected frequency fraction a number of times substantially at said original amplitude, said number being the inverse of said predetermined fraction.

7. An apparatus for using successive waves considered as arbitrary groups, each group having the same number of cycles of variable amplitude and variable frequency, comprising means responsive to and operating at said variable frequency for selecting a wave in each of said groups, means for determining the amplitude of each of said selected waves, and means for establishing a train of oscillations occurring at the frequency of operation of said selecting means, each of said oscillations having the amplitude of a corresponding selected wave.

8. An apparatus for using successive waves considered as arbitrary groups, each group having the same number of cycles of variable amplitude and variable frequency, comprising means responsive to and operating in time with said variable frequency for selecting a wave in each of said groups, means for determining the amplitude of each of said selected waves, means for establishing a train of oscillations occurring at the frequency of operation of said selecting means, and means for filtering said oscillation train to pass a sine wave of the frequency of operation of said selecting means and of the amplitude of said corresponding selected wave.

9. An apparatus for handling signal energy considered as continuous waves of variable frequency and of variable amplitude which when drawn on an amplitude-time plot make repeated crossings of the zero amplitude line comprising means for dividing said signal into first and second identical sub-signals, means for shifting the phase of said first sub-signal with respect to said second sub-signal, means for detecting said crossings of said first sub-signal, means for using only certain successive ones of said crossings for simultaneously measuring the amplitude of said second sub-signal, and means for transmitting a signal corresponding to said measured amplitudes.

10. An apparatus for handling signal energy considered as continuous waves of variable frequency and of variable amplitude which when drawn on an amplitude-time plot make repeated crossings of the zero amplitude line comprising means for dividing said signal into first and second identical sub-signals, means for shifting the phase of said first sub-signal with respect to said second sub-signal, means for detecting said crossings of said first sub-signal, means for using only certain successive ones of said crossings for simultaneously measuring the amplitude of said second sub-signal, means for transmitting a signal corresponding to said measured amplitudes, and means for receiving said transmitted signal and selecting a harmonic thereof.

11. Apparatus as in claim 9 including means for modulating said signal energy to a different frequency and for supplying the modulated signal energy to said dividing means.

References Cited in the file of this patent

UNITED STATES PATENTS

| | | |
|---|---|---|
| 2,153,969 | McCutchen et al. | Apr. 11, 1939 |
| 2,220,689 | Shore | Nov. 5, 1940 |
| 2,285,044 | Morris | June 2, 1942 |
| 2,438,903 | Deloraine et al. | Apr. 6, 1948 |
| 2,441,957 | De Rosa | May 25, 1948 |
| 2,448,718 | Koulicovitch | Sept. 7, 1948 |
| 2,452,547 | Chatterjea et al. | Nov. 2, 1948 |
| 2,538,150 | Farnham | Jan. 16, 1951 |
| 2,659,049 | Grieg et al. | Nov. 10, 1953 |
| 2,676,202 | Filipowsky | Apr. 20, 1954 |
| 2,680,153 | Boothroyd et al. | June 1, 1954 |
| 2,778,933 | Crist | Jan. 22, 1957 |
| 2,810,787 | Di Toro | Oct. 22, 1957 |